United States Patent [19]

Maltman et al.

[11] Patent Number: 4,851,471

[45] Date of Patent: Jul. 25, 1989

[54] PROCESS FOR MANUFACTURING PHOTOCHROMIC ARTICLES

[75] Inventors: William R. Maltman, St. Helens; Ian M. Threlfall, Wigan, both of England

[73] Assignee: Pilkington Brothers P.L.C., St. Helens, England

[21] Appl. No.: 942,770

[22] Filed: Dec. 17, 1986

[30] Foreign Application Priority Data

Dec. 19, 1985 [GB] United Kingdom ............... 8531295

[51] Int. Cl.$^4$ .............................................. C08K 5/35
[52] U.S. Cl. ................................. 524/719; 523/106; 524/720; 526/204
[58] Field of Search ............... 524/719, 720; 526/204; 523/106

[56] References Cited

U.S. PATENT DOCUMENTS 4,637,698  1/1987  Kwak et al. ..................... 351/163

*Primary Examiner*—Joseph L. Schofer
*Assistant Examiner*—J. M. Reddick
*Attorney, Agent, or Firm*—Burns, Doane, Swecker & Mathis

[57] ABSTRACT

A direct casting process for manufacturing a shaped synthetic plastic article, such as an ophthalmic lens, which has photochromic properties, the process comprising incorporating a photochromic spiro-oxazine compound into a mixture comprising a highly reactive polyfunctional monomer and a low amount of a polymerization catalyst, and curing the composition in a mould to form the shaped synthetic plastic article.

11 Claims, No Drawings

PROCESS FOR MANUFACTURING PHOTOCHROMIC ARTICLES

BACKGROUND OF THE INVENTION

1. FIELD OF THE INVENTION

The present invention relates to a direct casting process for manufacturing a photochromic article, in particular a photochromic ophthalmic lens.

2. DESCRIPTION OF THE PRIOR ART

It is known to use a variety of spiro-oxazine compounds as materials which impart photochromic properties to a polymerised host material such as a polymer of a polyol (allyl carbonate) monomer. Photochromism is a physical phenomenon which occurs when a chemical compound changes colour when it is exposed to ultraviolet radiation and then returns to its original colour when it is removed from the influence of the radiation.

Certain spiro-oxazine compounds have been suggested for use in making photochromic sunglasses and opthalmic lenses from synthetic plastic host materials. Examples of suitable spiro-oxazine photochromic compounds are given in U.S. Pat. No. 4215010, GB patent application No. 2117390A, European patent application No. 141407 and International patent application No. 85/02619.

A number of different ways of applying the photochromic compound or incorporating it into the host material have been described in the prior art. Typically, such methods include dissolving or dispersing the photochromic compound in the host material. One way of dispersing the photochromic compound into the host material is by "imbibation", i.e. diffusion of the photochromic compound into the host material by a suitable transfer mechanism such as immersion, thermal transfer, or vapour phase transfer.

European patent application No. 14107 suggests that photochromic spiro-oxazine compounds or compositions can be mixed with a polymerisable composition and cured to form an optically clear film, sheet or lens having photochromic properties. However, we have found that such a direct casting method does not readily produce satisfactory ophthalmic lenses having the required photochromic properties.

It appears that the free-radical polymerisation initiators which are conventionally used to initiate polymerisation of the monomer material used to form the synthetic plastic host material degrade the spiro-oxazine photochromic compounds.

Thus, for example, we have found that when one attempts to polymerise a monomer used very commonly in this field (diethylene glycol bis allylcarbonate—widely referred to by its brand name CR39) using a normal concentration of catalyst of about 3% by weight, and follows the procedure suggested in European patent application No. 141407—i.e. mixing the spiro-oxazine compound into the polymerisable composition and then curing the mixture—one finds that degradation of the spiro-oxazine compound is very extensive and no useful photochromic properties are exhibited by the resultant product.

SUMMARY OF THE INVENTION

We have now found that although photochromic spiro-oxazine compounds can be degraded in the presence of the curing catalysts, by selecting a highly reactive polyfunctional monomer and using a low catalyst concentration, one can obtain plastic films, sheets or lenses with useful ophthalmic photochromic properties.

Accordingly, the present invention provides a direct casting process for manufacturing a shaped synthetic plastic article having photochromic properties, which process comprises incorporating into a mixture comprising a highly reactive polyfunctional monomer and 0.01 to 1% by weight, based on the volume of the monomer, of a polymerisation catalyst, 0.05 to 5% by weight, based on the volume of the monomer, of a photochromic spiro-oxazine compound; introducing the resultant polymerisable composition into a mould, and curing the composition to form the shaped synthetic plastic article.

DESCRIPTION OF THE PREFERRED EMBODIMENTS

The shaped article may be a sheet, film or lens. Typically a plastic lens is formed by using a conventional direct casting process in which the polymerisable composition incorporating the photochromic spiro-oxazine compound is introduced into a mould and is then cured by heating. Suitable curing conditions are, for example, heating at a temperature ranging from room temperature to 100° C., generally over a period of about 5 hours. A preferred curing schedule is to subject the material to be cured to a temperature beginning at 40° C. rising up to a temperature within the range 80°–90° C. over a period of about 5 hours.

The highly reactive polyfunctional monomers used in the process of the invention are preferably methacrylates or acrylates of linear or branched aliphatic or aromatic liquid polyols such as glycols or bisphenols. Examples of specific monomers include ethylene glycol dimethyacrylate or diacrylate and the corresponding dimethacrylates or diacrylates of di-, tri- and tetra-ethylene glycol; the dimethacrylates of 1,2-propyleneglycol, of 1,2-dipropylene glycol, of 1,2-tripropylene glycol and of 1,3-butylene glycol; dimethacrylates of propanediol, butanediol, hexanediol and decanediol; trimethylol ethane trimethacrylate, trimethylol propane trimethacrylate, pentaerythritol trimethacrylate, 2,2,4-trimethyl-1,3-pentanediol dimethacrylate and 1,4-cyclohexanediol dimethacrylate.

Mixtures of the reactive polyfunctional monomers may also be used.

The highly reactive polyfunctional monomer or monomers may be used alone or in the presence of other copolymerisable monofunctional monomers which may be added to modify the physical properties—such as impact strength, castability and tintability—of the resultant polymer. The amount of co-monomer which may be added is up to 30°% by weight, preferably 5 to 15% by weight, based on the volume of the reactive polyfunctional monomer.

Typical comonomers are alkyl methacrylates such as cyclohexyl methacrylate, n-butyl methacrylate and lauryl methacrylate, which may be added to improve the impact resistance of the finished lens; ethoxylated bisphenol-A dimethacrylate, which is added to reduce the shrinkage which is found to occur during formation of the moulded article; and hydroxyalkyl methacrylates such as hydroxyethyl methacrylate and hydroxybutyl methacrylate which improve adhesion of the polymer to the mould surface during polymerisation.

Other co-monomer additives include methacrylic acid, aryl methacrylates such as benzyl methacrylate, allyl methacrylate, tetrahydrofurfurylmethacrylate; and polyether mono acrylates or mono methacrylates such as ethoxyethyl methacrylate.

The catalysts used are the conventional free-radical polymerisation catalysts used in the art, in particular, organic peroxides such as benzoyl peroxide and peroxydicarbonates such as isopropylperoxydicarbonate. The amount of catalyst used is kept as low as possible, and is from 0.01 to 1% by weight, based on the volume of the monomer.

The photochromic spiro-oxazine compound is used in an amount of from 0.05% to 5% by weight, based on the volume of the monomer.

A preferred class of photochromic spiro-oxazines is compounds of general formula (I)

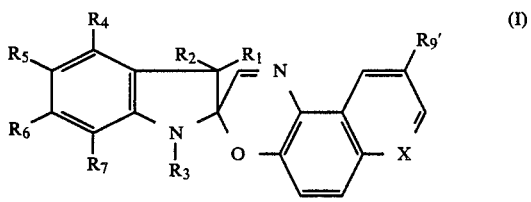

in which X represents —CH= or —N=, each of $R_1$ and $R_2$ independently represents a lower alkyl group, preferably methyl, or $R_1$ and $R_2$ together represent an alicyclic ring, $R_3$ represents a lower alkyl group, preferably methyl, each of $R_4$ and $R_7$ independently represents a hydrogen atom or a lower alkyl group, preferably methyl, each of $R_5$ and $R_6$ independently represents a hydrogen or halogen atom, a lower alkyl group which optionally may be fluorinated, or a lower alkoxy group, and $R'_9$ represents a hydrogen atom or a lower alkoxy group, preferably methoxy.

By the term alkyl or lower alkoxy group is meant an alkyl or alkoxy group having 1 to 5 carbon atoms.

Preferred $R_5$ and $R_6$ substituents are hydrogen or chlorine, methyl, methoxy or trifluoromethyl.

Although ranges of the amounts of catalyst and spiro-oxazine compound have been given above, it is to be understood that when relatively small amounts of spiro-oxazine compounds are used within the quoted range of 0.05 to 5% by weight, then correspondingly low amounts of catalyst within the range of 0.01 to 1% by weight must be used. A man skilled in the art will readily be able to determine by routine experimentation the optimum amounts of catalyst to be used for a given quantity of spiro-oxazine compound.

We have found that under the conditions of the present process, the photochromic spiro-oxazine compounds undergo less than 50% degradation and lead to good photochromic properties in the resultant synthetic plastic sheets or lenses.

Furthermore, the process of the present invention gives additional advantages over the other known methods of incorporating spiro-oxazine compounds into synthetic plastics host materials. Thus the resistance to light fatigue of lenses and other synthetic plastic articles made by the present process is substantially increased compared to that of comparative products obtained by surface dyeing or imbibation methods.

The fatigue resistance of a photochromic lens was measured by the time taken for half of the induced photochromic optical density to be destroyed when the lens was exposed to a simulated Air Mass 2 illumination at 25° C.

We have found that a 1.8 mm thick plano lenses cast from triethylene glycol dimethacrylate (TEGDM) containing 0.15% w/v photochromic spiro-oxazine compounds and 0.1% w/v catalyst and cured by heating from a temperature of 400° C. rising to 80° C. over a period of 5 hours exhibit half-lives of the order of 30,000 minutes. If greater amounts, for example 0.3% w/v, of the photochromic spiro-oxazine compounds are incorporated into the polymerisable composition, half-lives well in excess of 30,000 minutes are obtained.

In contrast, comparative lenses made from diethylene glycol bis allylcarbonate (CR39) and imbibed with the corresponding spiro-oxazine compounds so as to obtain an equivalent induced optical density showed half-lives of less than 15,000 minutes.

A further advantage of using the direct casting method of the present invention to form a photochromic synthetic plastic article such as a lens is that the speed of photochromic response of the resultant products is substantially improved when compared to imbibed products. We have found that both the rate of darkening and the rate of fading of photochromic materials prepared by the present process are improved in relation to comparable photochromic materials prepared by imbibing methods.

An indication of the speed of photochromic response is obtained by comparing the time required for a photochromic lens which is undergoing the darkening phase of its response to reach 88% of its transmission range (i.e. T88). When comparing the speed at which a darkened lens will fade, it is customary to compare ½ OD FT values, i.e. the time in seconds taken for the lens to fade to half of its total induced optical density, measured on standard samples of plastic, generally 1.8 mm thick, at 250° C. in standard simulated solar conditions at air mass 2 (see Parry Moon, J. Franklin Inst., 230 (1940), pages 583–617). The induced optical density is the difference between the optical density of the material in the fully darkened state and the optical density in the fully faded state, the optical density being defined in the conventional manner as $$\log_{10} \frac{I_i}{I_t},$$

where $I_i$ is the intensity of the incident light and $I_t$ is the intensity of the transmitted light. The induced optical density is thus a real measure of the photochromic effect. The time required to fade from the fully darkened condition to a condition of half the induced optical density (½ OD FT) is thus an effective measure for comparing fading times of materials having different values of light transmission in the bleached or faded state.

The fully darkened state of lenses made in accordance with the process of the present invention is defined as the state reached by a lens 1.8 mm thick at 25° C. after exposure to the above-mentioned standard simulated solar conditions at air mass 2 for 10 minutes.

We have found that not only is the fatigue resistance of plastics lenses made in accordance with the invention better than lenses made of CR39 plastic, but that the kinetics (i.e. speed of photochromic response) of the lenses of the present invention is also better than comparable CR39 lenses.

Thus we have found that the darkening rates of lenses prepared in accordance with the invention (1.8 mm thick plano lenses cast from TEGDM as described above) give T88 values of 30 seconds or less, and in some cases T88 is as low as 15 seconds.

CR39 lenses which have been imbibed with the corresponding photochromic spiro-oxazine compounds have T88 values of 30 to 150 seconds.

The fading rates of the lenses prepared in accordance with the invention were also found to be better, having a ½ OD FT of less than 30 seconds, typically 6–18 seconds.

Fading rates of the imbibed lenses gave ½ OD FT values usually greater than 30 seconds, but ranging from 15 to 72 seconds.

Lenses made in accordance with the process of the present invention typically exhibit a pale colouration in the faded condition, usually a very pale amber or very pale yellow green colouration.

If desired, the colour of the lens can be masked with conventional water-based dyes. For example, it is possible to make a lens which is light grey in its faded condition and darkens to a dense grey blue colouration when exposed to sunlight.

The present invention is illustrated further by the following Examples.

Example 1

An opthalmic lens was made by a conventional direct casting method using a plano lens mould comprising a pair of glass moulds sealed by a flexible gasket at their interface. The mould cavity was filled with a thermosettable compositiion consisting of, as monomer, triethyleneglycol dimethacrylate (TEGDM), with 0.1% by weight (based on the volume of monomer) of cyclohexyl peroxy percarbonate (CHPC), as catalyst, and 0.15% by weight (based on the volume of monomer) of a spiro-oxazine compound of formula I in which $R_1=R_2=R_3=CH_3$, $R_4=R_5=R_6=R_7=R_9'=H$ and $X=-CH=$. The mixture in the mould was cured by heating at a temperature of 40°–80° C. over 5 hours.

The lens which was obtained exhibited the following properties:

| Transmission range | |
|---|---|
| (at a peak wavelength of 610 nm) | 90/52 |
| T88 darkening time | 24 sec |
| 1/2 ODFT | 12 sec |
| Fatigue rating | 36,000 min |

Example 2

Example 1 was repeated, except that the spiro-oxazine compound used was a compound of formula I in which $R_1=R_2=R_3=CH_3$, $R_4=R_6=R_7=R_9'=H$, $R_5=OCH_3$ and $X=-N=$.

The resultant lens had the following properties:

| Transmission range | |
|---|---|
| (at a peak wavelength of 620 nm) | 86/29 |
| T88 darkening time | 18 sec |
| 1/2 ODFT | 30 sec |
| Fatigue rating | 50,000 min |

Example 3

Example 1 was repeated, except that the spiro-oxazine compound used was a compound of formula I in which $R_1=R_2=R_3=CH_3$, $R_4=R_6=R_7=H$, $R_5=-CF_3$, $R_9'=-OCH_3$ and $X=-CH=$.

The resultant lens had the following properties:

| Transmission range | |
|---|---|
| (at a peak wavelength of 580 nm) | 91/54 |
| T88 darkening time | 18 sec |
| 1/2 ODFT | 12 sec |
| Fatigue rating | 36,000 min |

Example 4

Example 3 was repeated, except that the spiro-oxazine compound used was a compound of formula I in which $R_1=R_2=R_3=CH_3$, $R_4=R_5=R_6=R_7=H$, $R_9'=OCH_3$ and $X=-CH=$.

The resultant lens had the following properties:

| Transmission range | |
|---|---|
| (at a peak wavelength of 600 nm) | 88/45 |
| T88 darkening time | 30 sec |
| 1/2 ODFT | 12 sec |
| Fatigue rating | 22,500 min |

Example 5

Example 2 was repeated, except that the spiro-oxazine compound used was a compound of formula I in which $R_1=R_2=R_3=CH_3$, $R_4=R_5=R_6=R_7=R_9'=H$, and $X=-N=$.

The resultant lens had the following properties:

| Transmission range | |
|---|---|
| (at a peak wavelength of 600 nm) | 89/43 |
| T88 darkening time | 12 sec |
| 1/2 ODFT | 18 sec |
| Fatigue rating | 29,200 min |

Although the invention has been described with preferred embodiments, it is to be understood that variations and modifications may be resorted to as will be apparent to those skilled in the art. Such variations and modifications are to be considered to fall within the scope of the claims which follow.

What is claimed is:

1. A direct casting process for manufacturing a plastic lens having photochromic properties, which process comprises preparing a polymerizable composition comprising a polyfunctional monomer which is a methacrylate or acrylate monomer having two or more reactive functional groups, and 0.01 to 1% by weight, based on the volume of the monomer, of a polymerization catalyst, and 0.5 to 5% by weight, based on the volume of the monomer, of a photochromic spiro-oxazine compound; introducing the resultant polymerizable composition into a mold, and curing the composition to form a shaped synthetic plastic lens.

2. A process according to claim 1, wherein the mixture is cured at temperatures ranging from room temperature to 100° C.

3. A process according to claim 2, wherein the temperature range is from 40° to 80° C.

4. A process according to claim 1, wherein the curing is performed over a period of 5 hours.

5. A process according to claim 1, wherein the amount of the spiro-oxazine compound is 0.3% by weight.

6. A process according to any one of the preceding claims, wherein the spiro-oxazine compound is a compound of general formula (I):

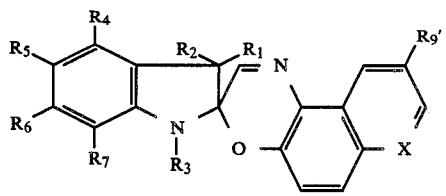

in which X represents —CH= or —N=, each of $R_1$ and $R_2$ independently represents a lower alkyl group, or $R_1$ and $R_2$ together represent an alicyclic ring, $R_3$ represents a lower alkyl group, each of $R_4$ and $R_7$ independently represents a hydrogen atom or a lower alkyl group, each of $R_5$ and $R_6$ independently represents a hydrogen or halogen atom, a lower alkyl group, a fluorinated lower alkyl group, or a lower alkoxy group, and $R'_9$ represents a hydrogen atom or a lower alkoxy group.

7. A process according to claim 6, wherein each of $R_1$, $R_2$ and $R_3$ independently represents a methyl group, each of $R_4$ and $R_7$ independently represents a methyl group, and each of $R_5$ and $R_6$ independently represents a methyl, trifluoromethyl or methoxy group, and $R'_9$ represents a methoxy group.

8. A process according to claim 1, wherein the polyfunctional monomer is a methacrylate or acrylate of a linear or branched aliphatic or aromatic liquid polyol.

9. A process according to claim 8, wherein the polyfunctional monomer is triethylene glycol dimethacrylate, ethylene glycol dimethacrylate, 1,3-butyleneglycol dimethacrylate, or trimethylol propane trimethacrylate.

10. A process according to claim 1, wherein up to 30% by weight, based on the volume of the polyfunctional monomer, of a monofunctional acrylate or methacrylate comonomer is added.

11. A process according to claim 1, wherein the plastic lens is an ophthalmic lens.

* * * * *

UNITED STATES PATENT AND TRADEMARK OFFICE
CERTIFICATE OF CORRECTION

PATENT NO.     : 4,851,471
DATED          : July 25, 1989
INVENTOR(S)    : William R. Maltman and Ian M. Threlfall It is certified that error appears in the above-identified patent and that said Letters Patent is hereby corrected as shown below:

Column 6,
Line 54, delete "0.5" and insert in lieu thereof -- 0.05 --.

Signed and Sealed this

Twenty-ninth Day of April, 2003

JAMES E. ROGAN
*Director of the United States Patent and Trademark Office*